United States Patent
Yeum et al.

(10) Patent No.: US 10,146,970 B2
(45) Date of Patent: Dec. 4, 2018

(54) RFID READER

(71) Applicant: HANA MICRON INC., Asan-si, Chungcheongnam-do (KR)

(72) Inventors: Sang Yeul Yeum, Yongin-si (KR); Hyeong Seop Song, Anyang-si (KR); Jung Hwan Jo, Siheung-si (KR)

(73) Assignee: HANA MICRON INC., Asan-si, Chungcheongnam-Do (KR)

( * ) Notice: Subject to any disclaimer, the term of this patent is extended or adjusted under 35 U.S.C. 154(b) by 5 days.

(21) Appl. No.: 15/493,212

(22) Filed: Apr. 21, 2017

(65) Prior Publication Data

US 2018/0307876 A1    Oct. 25, 2018

(51) Int. Cl.
| | |
|---|---|
| G06K 7/10 | (2006.01) |
| G01S 5/04 | (2006.01) |
| G06K 7/00 | (2006.01) |
| G01S 5/14 | (2006.01) |
| H04B 5/00 | (2006.01) |

(52) U.S. Cl.
CPC ............ G06K 7/10316 (2013.01); G01S 5/04 (2013.01); G06K 7/0008 (2013.01); G01S 5/14 (2013.01); H04B 5/0037 (2013.01)

(58) Field of Classification Search
CPC .... G06K 7/10316; G06K 7/0008; G01S 5/14; G01S 11/02; G01S 5/04; G01S 5/12; H04B 5/0037; H04B 1/525
USPC ...................... 340/10.1, 8.1, 572.1
See application file for complete search history.

(56) References Cited

U.S. PATENT DOCUMENTS

| | | | |
|---|---|---|---|
| 7,183,922 B2 * | 2/2007 | Mendolia | G01S 5/04 340/572.1 |
| 2009/0058603 A1 * | 3/2009 | Seppa | G06K 7/0008 340/10.1 |
| 2010/0109903 A1 * | 5/2010 | Carrick | G01S 5/14 340/8.1 |
| 2013/0135084 A1 * | 5/2013 | Chakravarty | H04B 5/0037 340/10.1 |
| 2014/0085057 A1 * | 3/2014 | Horst | G06K 7/10316 340/10.51 |

\* cited by examiner

*Primary Examiner* — Ali Neyzari
(74) *Attorney, Agent, or Firm* — Rabin & Berdo, P.C.

(57) ABSTRACT

A radio frequency identification (RFID) reader includes an RFID module configured to generate a radio frequency (RF) signal, a power divider configured to divide the generated RF signal into a plurality of RF signals having a same power, at least one antenna configured to transmit the divided RF signals, and a sensor configured to detect an object within a predetermined area and transmit a result of the detection of the object to the RFID module.

7 Claims, 3 Drawing Sheets

RFID READER

BACKGROUND OF THE INVENTION

Field of the Invention

The present invention relates to a radio frequency identification (RFID) reader, and more particularly, to an RFID reader that can operate efficiently using limited power.

Discussion of the Related Art

Radio frequency identification (RFID) is a technology that provides a basis for recognizing, tracking, and controlling objects by recognizing tags attached to the objects using radio frequency (RF) signals.

RFID is a non-contact type automatic identification technology that attaches an ultra-small chip and an antenna, which are mediated through radio waves, to an object in the form of a tag so that RFID can exchange a large amount of information in comparison to existing bar codes, have a very long recognition distance, and transmit through obstructions except metal.

Because of these many advantages, RFID is now being utilized in various forms of industry.

Generally, RFID includes an RFID reader and a tag. The RFID reader includes an internal or external antenna, and this antenna emits an RF signal to form an electromagnetic field, that is, an RF field. When the tag enters the RF field, the tag receives the RF signal emitted from the antenna of the RFID reader, and transmits information stored in the tag as a tag signal to the RFID reader using the received RF signal. Then, the RFID reader analyzes the received tag signal and acquires tag information.

Meanwhile, in the communication between the RFID reader and the tag, an error rate, stability, and recognition distance of the tag signal that the RFID reader receives may vary depending on a communication environment such as a position and velocity at which the tag passes through the RF field formed by the RF signal, characteristics of an object to which the tag is attached, and this causes a decrease in the recognition rate of the tag signal and a decrease in the reliability of the overall RFID.

In addition, a problem may occur in tag recognition when power consumption according to an installation environment of the RFID reader is not considered.

Therefore, there is a need for research on a structure of an RFID reader considering various communication environments.

SUMMARY OF THE INVENTION

The present invention provides a radio frequency identification (RFID) reader including: an RFID module configured to generate a radio frequency (RF) signal; a power divider configured to divide the generated RF signal into a plurality of RF signals having a same power; at least one antenna configured to transmit the divided RF signals; and a sensor configured to detect an object within a predetermined area and transmit a result of the detection of the object to the RFID module.

Also, when the sensor detects the object within the predetermined area, the RFID module may generate the RF signal and control the power divider and the at least one antenna to transmit the generated RF signal.

Also, the RFID reader may further include a tag power detector configured to measure power of a tag signal received from an RFID tag through the at least one antenna and determine whether to transmit the tag signal to the RFID module based on the measured power.

Also, the RFID reader may further include a power detector provided between the power divider and the RFID module, configured to measure a power difference value between an RF signal output from the RFID module and an RF signal input to the power divider and provide the measured power difference value to the RFID module.

Also, the RFID module may determine whether the at least one antenna or the power divider operates normally based on the measured power difference value.

Also, the RFID module may further include at least one antenna moving unit configured to adjust a direction of the RF signal transmitted from each of the at least one antenna.

Also, the RFID module may control the at least one antenna moving unit to adjust the direction of the RF signal transmitted from each of the at least one antenna based on a predetermined procedure so as to maintain a uniform coverage of the RF signal.

DETAILED DESCRIPTION OF THE INVENTION

Figure 1:
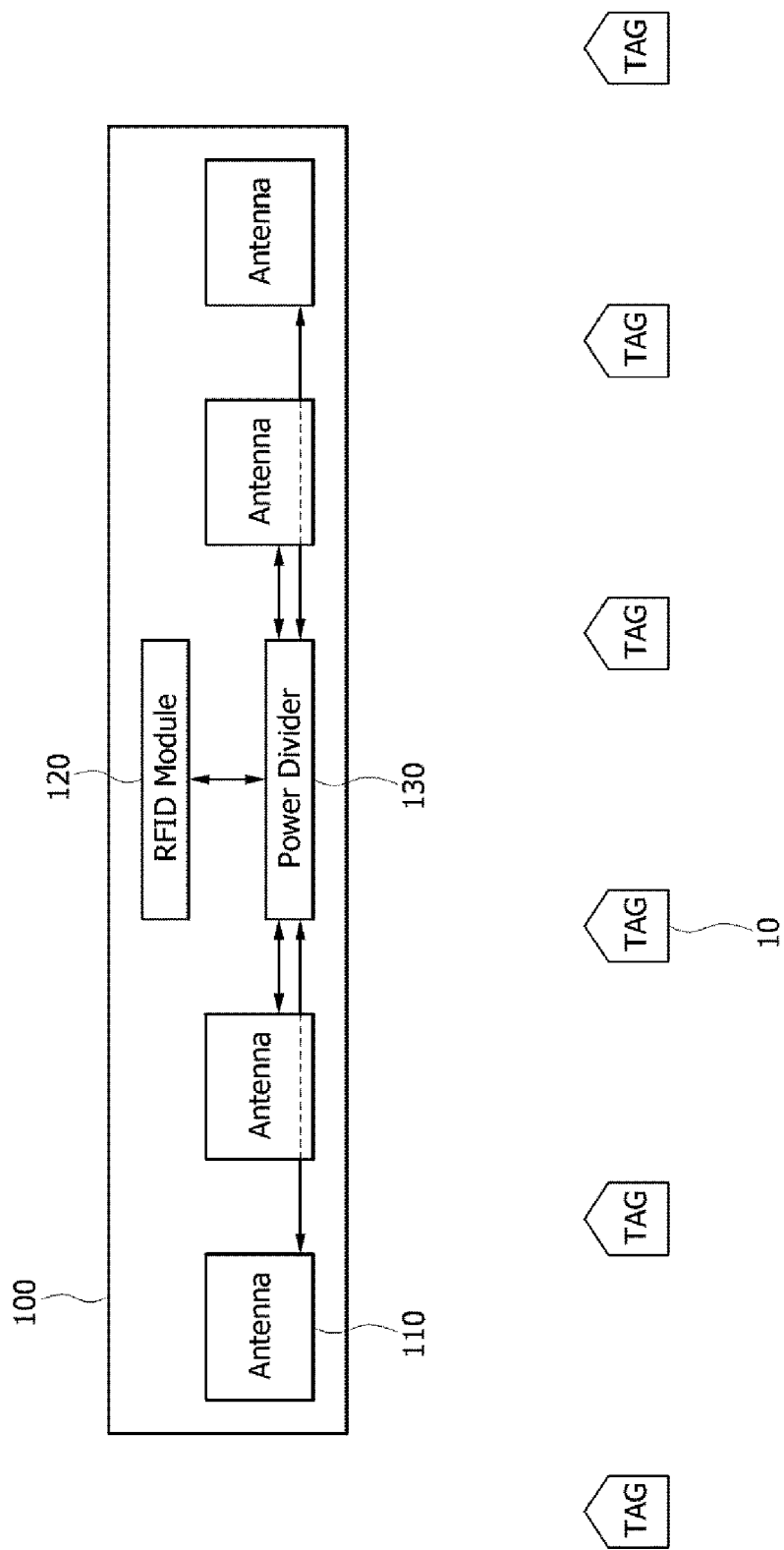
FIG. 1 illustrates a structure of a radio frequency identification (RFID) reader 100 according to an embodiment of the present invention.

Hereinafter, preferred embodiments according to the present invention will be described in detail with reference to the accompanying drawings. The following detailed description along with the accompanying drawings is intended to illustrate exemplary embodiments of the invention and is not intended to represent the only embodiments in which the present invention can be practiced. In addition, portions unrelated to the following description will be omitted to clearly illustrate the present invention in the drawings. Throughout the specification, the same reference numerals can be used for the same or similar components.

In an embodiment of the present invention, the expressions "or", "at least one," etc., may denote one of the words listed together or a combination of two or more thereof. For example, "A or B" and "at least one of A and B" may include only one of A and B or both A and B.

FIG. 1 illustrates a structure of a radio frequency identification (RFID) reader 100 according to an embodiment of the present invention.

The RFID reader 100 may transmit a radio frequency (RF) signal for activating an RFID tag 10 to the outside. An electromagnetic field, that is, an RF field, is generated by the RF signal transmitted to the outside, and when the RFID tag 10 enters the generated RF field, the RFID tag 10 is activated. The RFID tag 10 may perform backscattered modulation on the RF signal transmitted from the RFID reader 100 to transmit a tag signal including unique identification information and data information to the RFID reader 100.

Hereinafter, referring to FIG. 1, the RFID reader 100 may include at least one antenna 110, an RFID module 120, and a power divider 130.

The at least one antenna 110 is a directional antenna, and may have a highly directional radiation pattern and include a power supply structure and a radiation structure.

The radiation structure may directly transmit an RF signal or receive a tag signal, and the power supply structure may supply power to the radiation structure.

Radiation efficiency of the RF signal may be determined by adjusting a height between the radiation structure and the power supply structure, and the radiation structure may have at least one of a printed circuit board (PCB) type including a dielectric and a plated metal body type (e.g., a plated Al or Cu metal body).

The at least one antenna 110 may increase a recognition distance by transmitting the RF signal using an ultra-high frequency band wavelength (e.g., 433 MHz or 860 to 960 MHz). Also, the at least one antenna 110 may simultaneously provide a near field and a far field.

The RFID module 120 is configured to control the overall operation of the RFID reader 100, and may generate the RF signal for activating the RFID tag 10 or detect a tag signal received from the RFID tag 10.

The power divider 130 may distribute the RF signal, which is generated and provided by the RFID module 120, to the at least one antenna 110.

For example, in an RFID reader including four antennas, the power divider 130 may divide the RF signal generated and provided by the RFID module 120 into four RF signals having the same power, and each RF signal divided into the four RF signals maybe symmetrically divided in terms of power to be supplied to the four antennas.

Each of the RF signals supplied to the four antennas may be transmitted to the outside with directionality according to arrangement of the directional antennas, and may form a uniform radiation pattern in a predetermined direction due to transmission characteristics of the same RF signal in terms of power.

As an example, the RFID reader 100 of the present invention may include four antennas 110, the RFID module 120, and the power divider 130 within a pipe-shaped structure ranging from 1 to 2 m so that the RFID tag 10 may be recognized within a range of 2 to 3 m, and each pair of two antennas 110 may be arranged to be laterally symmetrical with respect to the RFID module 120 and the power divider 130.

In addition, the RFID module 120, the power divider 130, and the antenna 110 may be connected to each other in a wired manner using a cable or the like, or in a wireless manner using a communication module.

The RFID reader 100, which is a pipe-shaped structure having a length of 1 to 2 m, may form a radiation pattern having a width coverage corresponding to an interval of 1.5 times a pipe length in a pipe axis direction. That is, in the case of a pipe structure having a length of 2 m, it is possible to form a radiation pattern having a width coverage corresponding to 3 m in length.

Meanwhile, in a space or environment having a plurality of RFID readers 100, duplicate recognition of the RFID tag 10 that approaches between the plurality of RFID readers 100 may be a problem.

For example, in an overlapping interval between an RF field of a first RFID reader and an RF field of a second RFID reader adjacent to the first RFID reader, the first RFID reader and the second RFID reader may all receive a single tag signal and process the received single tag signal, which may be wasteful in terms of efficiency.

Accordingly, when the received tag signal does not exceed a predetermined power value, a method of processing the tag signal as noise may be selectively applied.

Therefore, although not shown, the RFID reader 100 may selectively include a tag power detector (not shown) for measuring a power value of a tag signal.

The tag power detector (not shown) may measure a power value of the received tag signal and transmit the measured power value to the RFID module 120, and the RFID module 120 may remove the tag signal as noise when the measured power value does not exceed the predetermined power value.

In addition, the tag power detector (not shown) may measure the power value of the received tag signal, and may remove the tag signal as noise without transmitting the measured power value to the RFID module 120 when the measured power value does not exceed the predetermined power value.

Figure 2:
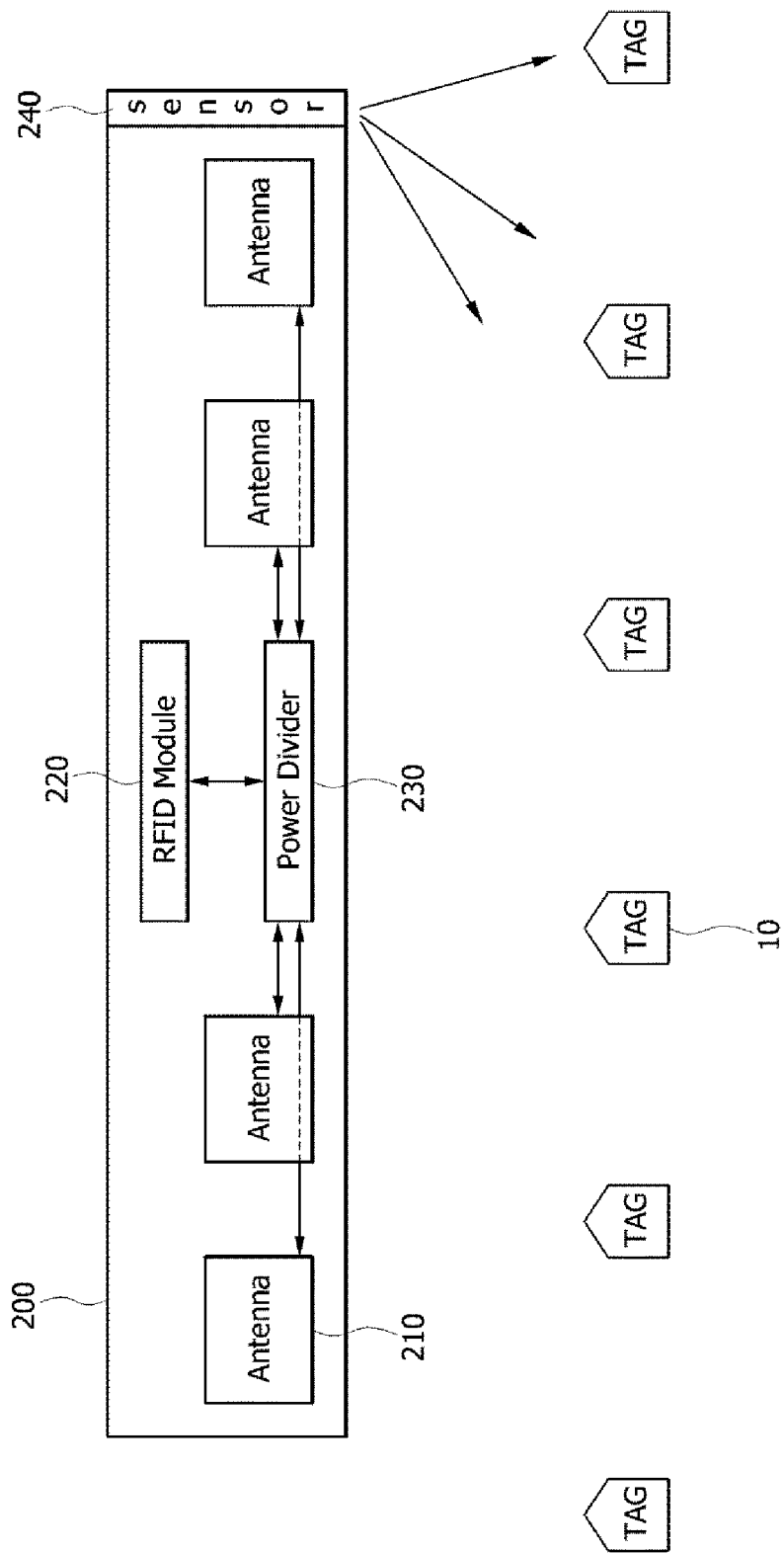
FIG. 2 illustrates a structure of an RFID reader 200 according to another embodiment of the present invention.

FIG. 2 illustrates a structure of an RFID reader 200 according to another embodiment of the present invention.

Referring to FIG. 2, the RFID reader 200 may include at least one antenna 210, an RFID module 220, a power divider 230, and a sensor 240.

The at least one antenna 210 is a directional antenna, and may have highly directional radiation pattern and include a power supply structure and a radiation structure.

The RFID module 220 is configured to control the overall operation of the RFID reader 200, and may generate an RF signal for activating an RFID tag 10 and detect a tag signal received from the RFID tag 10.

The power divider 230 may distribute the RF signal, which is generated and provided by the RFID module 220, to the at least one antenna 210.

Components such as the antenna 210, the RFID module 220, and the power divider 230 are the same as those described in the embodiment of FIG. 1. Therefore, the embodiment of FIG. 1 can be referred to for detailed descriptions of the components, and descriptions will be made below focusing on differences from the embodiment of FIG. 1.

The sensor 240 may include at least one of a temperature sensor, an optical sensor, and an acoustic sensor.

In the present embodiment, the optical sensor, specifically, an infrared sensor, will be mainly described, but the present invention is not limited thereto, and it should be understood that the same technical idea can be applied to the temperature sensor and the acoustic sensor.

The infrared sensor may detect movement of an object within a predetermined area of the RFID reader 200. Specifically, when an object enters a specific area in front of the RFID reader 200, the infrared sensor may detect this and notify the RFID module 220 of the detected information.

The RFID module 220 may generate an RF signal and transmit the generated RF signal through the antenna 210 only when the object is detected within the predetermined area by the infrared sensor, and the RFID module 220 may minimize power consumption of the RFID reader 200 by stopping the generation of the RF signal and the transmission of the RF signal through the antenna 210 when the object is not detected within the predetermined area.

As an example, the RFID reader 200 of the present invention may include four antennas 210, the RFID module 220, and the power divider 230 within a pipe-shaped structure ranging from 1 to 2 m so as to recognize the RFID tag 10 within a range of 2 to 3 m, and each pair of two antennas 210 may be arranged to be laterally symmetrical with respect to the RFID module 220 and the power divider 230.

The infrared sensor may be arranged at one end or both ends of the pipe-shaped structure, and may sense whether an object enters any part of a radiation coverage area of the RFID reader 200.

Figure 3:
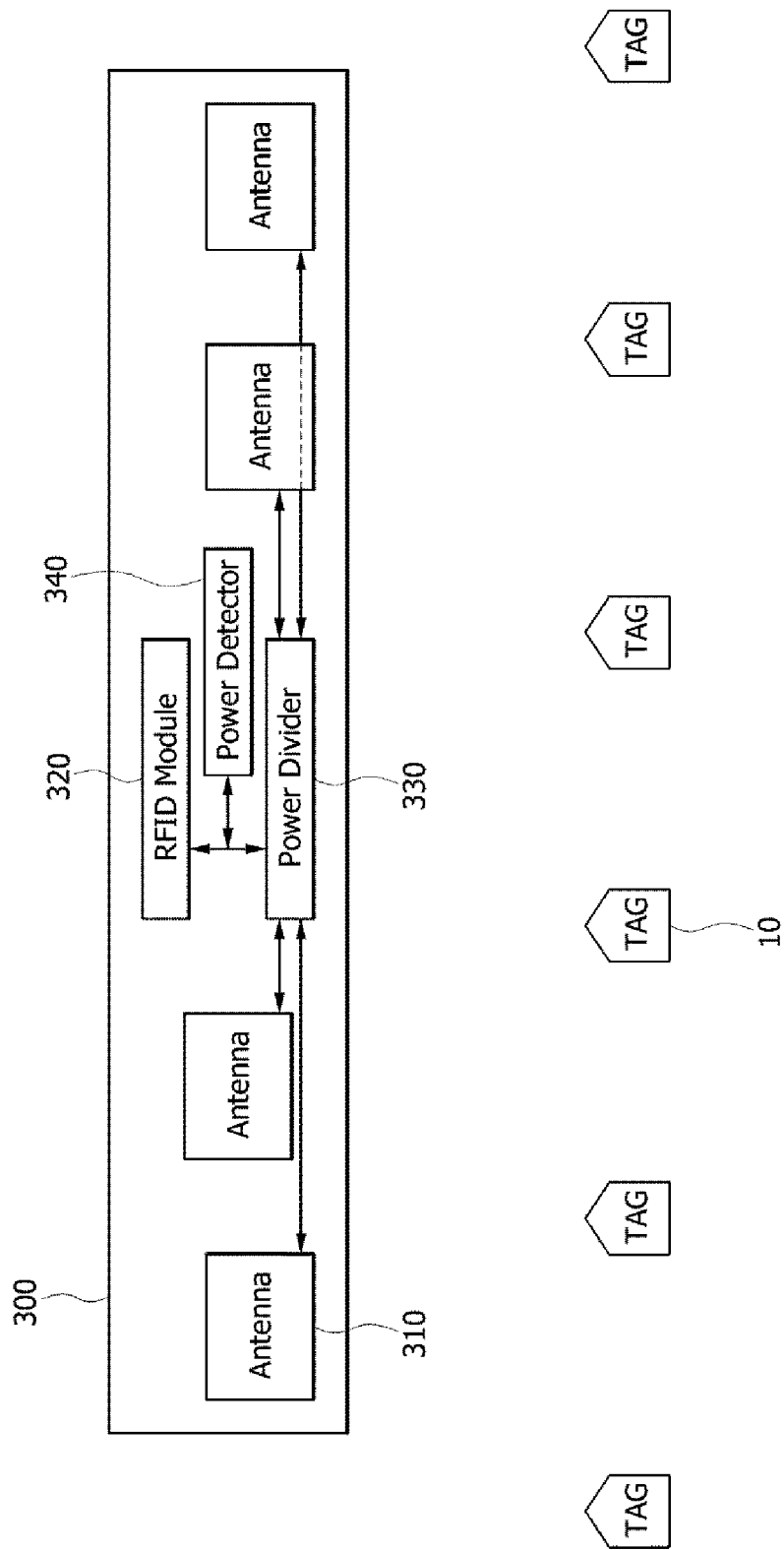
FIG. 3 illustrates a structure of an RFID reader 300 according to still another embodiment of the present invention.

FIG. 3 illustrates a structure of an RFID reader 300 according to still another embodiment of the present invention.

Referring to FIG. 3, the RFID reader 300 may include at least one antenna 310, an RFID module 320, a power divider 330, and a power detector 340.

The at least one antenna 310 is a directional antenna, and may have a highly directional radiation pattern and include a power supply structure and a radiation structure.

The RFID module 320 is configured to control the overall operation of the RFID reader 300, and may generate an RF signal for activating an RFID tag 10 and detect a tag signal received from the RFID tag 10.

The power divider 330 may distribute the RF signal, which is generated and provided by the RFID module 320, to the at least one antenna 310.

Components such as the antenna 310, the RFID module 320, and the power divider 330 are the same as those described in the embodiment of FIG. 1. Therefore, the embodiment of FIG. 1 can be referred to for detailed descriptions of the components, and descriptions will be made below focusing on differences from the embodiment of FIG. 1.

The power detector 340 is provided between the power divider 330 and the RFID module 320 to detect a voltage or power difference value between an RF signal generated and output by the RFID module 320 and an RF signal input to the power divider 330 and to provide the detected voltage or power difference value to the RFID module 320.

The RFID module 320 may detect whether the power divider 330 normally distributes the RF signal using the provided voltage or power difference value. That is, when an output of the power divider 330 is not the same, a variation of an input voltage or input power of the power divider 330 occurs, and the RFID module 320 may determine whether the power divider 330 normally operates using the corresponding difference value.

In addition, even when a failure occurs in the at least one antenna 310 or a problem occurs in a cable between the power divider 330 and the corresponding antenna 310, a variation of the input voltage or input power of the power divider 330 occurs as described above, and whether the antenna 310 is abnormal may be determined.

When there is a problem in an RF signal distribution of the power divider 330 or a problem occurs in an RF signal output of the specific antenna 310, a problem may occur when recognizing the RFID tag 10, and a quick recovery may be required due to a considerable power consumption of the RFID reader 300.

When an abnormal operation of the power divider 330 or a failure of the specific antenna 310 is detected, the RFID module 320 may notify the outside thereof.

Meanwhile, although not shown, the RFID reader 300 may selectively include an antenna moving unit (not shown).

The antenna moving unit (not shown) may adjust an RF signal transmission direction for each of the at least one antenna 310.

When recognizing that there is a problem in the RF signal distribution of the power divider 330 or an RF signal output of a specific antenna, the RFID module 320 may control the antenna moving unit (not shown) to adjust the RF signal transmission direction for each of the at least one antenna 310 to maintain a uniform RF signal coverage.

At this time, the transmission direction of each of the antennas may be adjusted according to control values of the antenna moving unit (not shown) which can maintain an optimized RF signal coverage for various scenarios according to the occurrence/nonoccurrence of each abnormality which has been previously stored in the RFID module 320.

For example, assuming an RFID reader including first, second, third, and fourth antennas, when a failure of the first antenna or an abnormality in the RF signal distribution occurs, it is possible to control transmission directions of the second to fourth antennas to be moved to a left side within a certain range.

Meanwhile, although the RFID reader to which the tag power detector (not shown), the sensor 240, the power detector 340, and the antenna moving unit (not shown) are selectively applied is described in the embodiment described above, the present invention is not limited thereto, and it should be understood that an RFID reader including all or some of the corresponding components can be applied in the same manner.

The embodiments of the present invention disclosed in the present specification and drawings are merely illustrative examples of the present invention in order to facilitate understanding of the present invention, and are not intended to limit the scope of the present invention. Accordingly, it should be construed that all modifications and variations derived from the technical idea of the present invention as well as the embodiments disclosed in the present specification are included in the scope of the present invention.

What is claimed is:

1. A radio frequency identification (RFID) reader, comprising:
    an RFID module configured to generate a radio frequency (RF) signal;
    a power divider configured to divide the generated RF signal into a plurality of RF signals having a same power;
    at least one antenna configured to transmit the divided RF signals; and
    a sensor configured to detect an object within a predetermined area and transmit a result of the detection of the object to the RFID module.

2. The RFID reader of claim 1, wherein, when the sensor detects the object within the predetermined area, the RFID module is configured to generate the RF signal and to control the power divider and the at least one antenna to transmit the generated RF signal.

3. The RFID reader of claim 1, further comprising:
    a tag power detector configured to measure power of a tag signal received from an RFID tag through the at least one antenna and determine whether to transmit the tag signal to the RFID module based on the measured power.

4. The RFID reader of claim 1, further comprising:
    a power detector provided between the power divider and the RFID module, configured to measure a power difference value between an RF signal output from the RFID module and an RF signal input to the power divider and provide the measured power difference value to the RFID module.

5. The RFID reader of claim 4, wherein the RFID module is configured to determine whether the at least one antenna or the power divider operates normally based on the measured power difference value.

6. The RFID reader of claim 5, further comprising:
at least one antenna moving unit configured to adjust a direction of the RF signal transmitted from each of the at least one antenna.

7. The RFID reader of claim 6, wherein the RFID module is configured to control the at least one antenna moving unit to adjust each of the at least one antenna based on a predetermined procedure so as to maintain a uniform coverage of the RF signal.

\* \* \* \* \*